(12) United States Patent
Curtis et al.

(10) Patent No.: US 6,912,711 B1
(45) Date of Patent: Jun. 28, 2005

(54) METHOD OF APPLYING AN UPDATE TO A CONTAINED COLLECTION OF PROGRAM AND DATA FILES BASED UPON VERSIONS

(75) Inventors: Bryce Allen Curtis, Round Rock, TX (US); Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,750

(22) Filed: May 25, 2000

(51) Int. Cl.$^7$ ............................................... G06F 9/445
(52) U.S. Cl. ...................... 717/173; 717/175; 717/176; 709/203; 709/219
(58) Field of Search ............................. 717/168–178; 709/203, 219

(56) References Cited

U.S. PATENT DOCUMENTS

| | | | |
|---|---|---|---|
| 5,019,963 A | 5/1991 | Alderson et al. | 364/200 |
| 5,155,847 A | 10/1992 | Kirouac et al. | 395/600 |
| 5,794,052 A | 8/1998 | Harding | 395/712 |
| 5,951,639 A | 9/1999 | MacInnis | 709/217 |
| 5,999,740 A * | 12/1999 | Rowley | 717/173 |
| 6,370,686 B1 * | 4/2002 | Delo et al. | 717/174 |
| 6,381,742 B2 * | 4/2002 | Forbes et al. | 717/176 |
| 6,427,227 B1 * | 7/2002 | Chamberlain | 717/168 |
| 6,477,703 B1 * | 11/2002 | Smith et al. | 717/168 |

* cited by examiner

*Primary Examiner*—Tuan Dam
*Assistant Examiner*—Chuck Kendall
(74) *Attorney, Agent, or Firm*—Duke W. Yee; Jeffrey S. LaBaw; Stephen R. Tkacs

(57) ABSTRACT

A method, system, and apparatus for updating code in a software program is provided. In a preferred embodiment, a patch is provided to a plurality of versions of a program, wherein the program is updated by an installation program and a plurality of versions of the installer program exist. Next, it is determined whether the version of the installer program is incorrect. If it is, the installer program is updated from files in the patch. The patch is then installed into the program using the updated installer program.

39 Claims, 3 Drawing Sheets

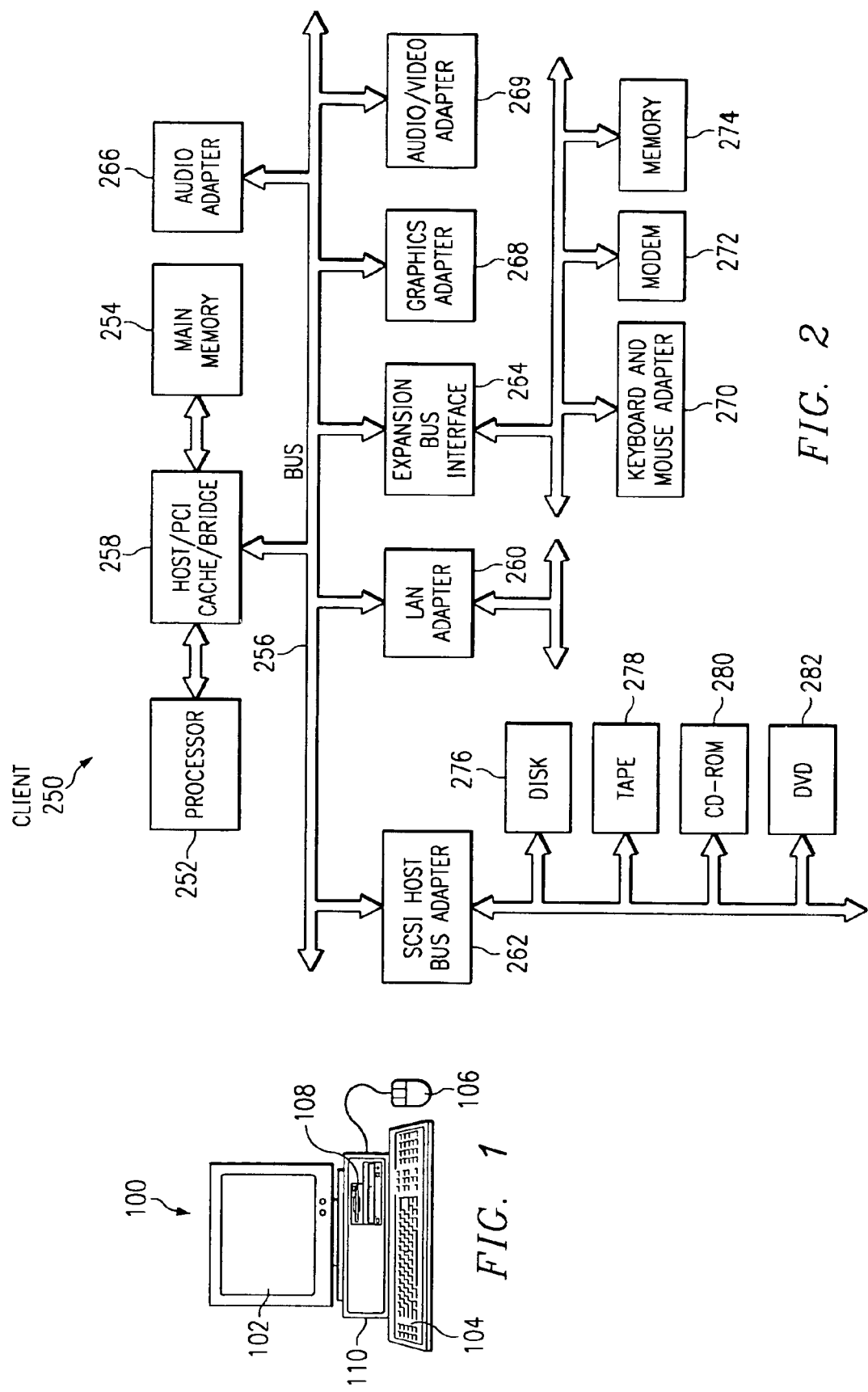

METHOD OF APPLYING AN UPDATE TO A CONTAINED COLLECTION OF PROGRAM AND DATA FILES BASED UPON VERSIONS

BACKGROUND OF THE INVENTION

1. Technical Field

The present invention relates generally to the field of computer software and, more particularly, to methods and system for updating programs and data files based upon versions.

2. Description of Related Art

Software development is the process of creating a software application program, such as, for example, a word processor, web browser, or spreadsheet, to use on a computer. To create these software application programs, software developers (or programmers) utilize software developer's toolkits (toolkits), such as, for example, Java developer's toolkit (JDK), which is available from Sun Microsystems, Inc. Toolkits provide the software developer or programmer with an integrated set of software routines and utilities that aid the programmer in writing and developing software application programs and/or in creating and maintaining databases. For example, for graphical interfaces, a toolkit may provide the tools and libraries for creating menus, dialog boxes, fonts and icons. The toolkit also provides the means to link the application program to libraries of software routines and to link the program with the operating environment, such as Windows™. Windows is a product and trademark of Microsoft Corporation of Redmond, Wash.

The current pace of technological innovation and change is faster than ever before. In particular, developments in semiconductor and other computer hardware technologies are creating faster and more powerful data processing systems every day. These developments create new opportunities and capabilities which software developers may utilize to provide better, faster software applications having more features desired by users.

To keep up with and utilize these technological changes in computing systems and to keep up with or ahead of the competition, software developers are constantly updating and modifying their programs to add more features and to perform faster and more efficiently. However, not all data processing systems utilize the same type of computer architecture nor do they all utilize the same operating systems. Thus, many applications have many versions written, each version intended for use on a different type of data processing system. For example, a consumer may purchase Quicken® for Windows or Quicken for the Macintosh™, depending on the type of computer the consumer owns. Quicken is a personal financial management software product and a registered trademark of Intuit Inc. of Mountain View, Calif. Macintosh is a trademark of Apple Computer, Inc. of Cupertino, Calif.

Currently, when an update or modification is made to an installation toolkit providing support for new features that may be useful for the software application programs, each version of the installation toolkit used in the application programs must have its own update created to update the installer for each application program. This is tedious and time consuming, thus many times, developers do not release an immediate update to their application after a fix or improvement is made waiting instead until many improvements have been made. However, many times users are anxiously awaiting these changes and improvements. Thus, it would be advantageous to have a method, system, and apparatus for the creation of a single update program that may update the many versions of an installer toolkit and work across all supported hardware platforms and/or operating systems. Such single update program should free the developer from having to create a distinct update program for each version of the program and for each hardware platform and operating system on which the program executes, thus encouraging more frequent releases of updates.

SUMMARY OF THE INVENTION

The present invention provides a method, system, and apparatus for updating code of a software installer program. In a preferred embodiment a program, such as a patch, is provided to a plurality of versions of an install program, wherein the program is updated by an installation program and a plurality of versions of the installer program exist. Next, it is determined whether the version of the installer program is incorrect. If the version is old, the installer program is updated from files in the patch. The patch is then installed into the program using the updated installer program.

BRIEF DESCRIPTION OF THE DRAWINGS

The novel features believed characteristic of the invention are set forth in the appended claims. The invention itself, however, as well as a preferred mode of use, further objective and advantages thereof, will best be understood by reference to the following detailed description of an illustrative embodiment when read in conjunction with the accompanying drawings, wherein:

FIG. 1 depicts a pictorial representation illustrating a data processing system in which the present invention may be implemented in accordance with a preferred embodiment of the present invention;

FIG. 2 depicts a block diagram of a data processing system in which the present invention may be implemented;

DETAILED DESCRIPTION OF THE PREFERRED EMBODIMENT

Figure 3:
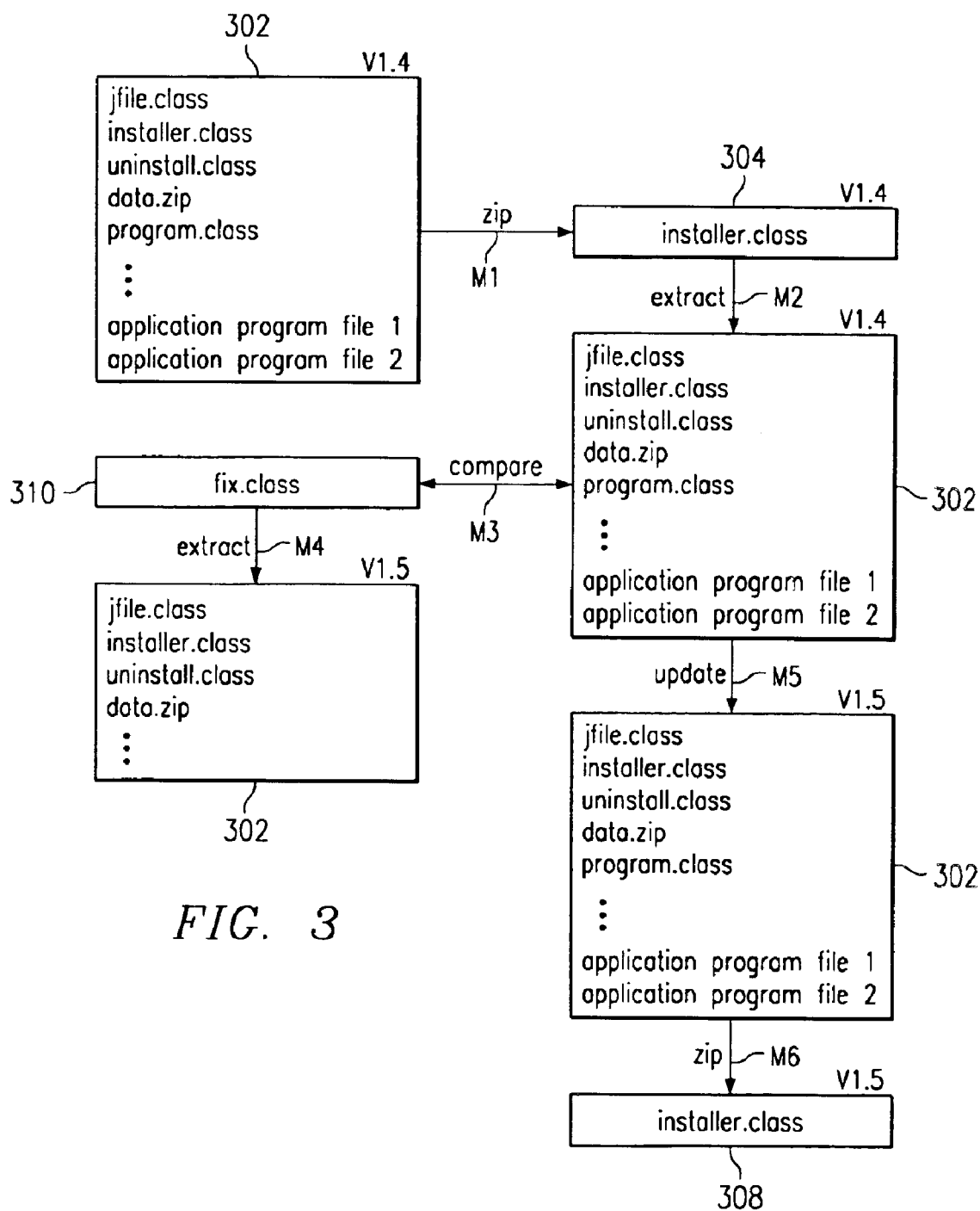
FIG. 3 depicts a block diagram illustrating a method for updating an installation file or program in accordance with the present invention.

With reference now to the figures and, in particular, with reference to FIG. 1, a pictorial representation illustrating a data processing system in which the present invention may be implemented is depicted in accordance with a preferred embodiment of the present invention. A personal computer 100 is depicted which includes a system unit 110, a video display terminal 102, a keyboard 104, storage devices 108, which may include floppy drives and other types of permanent and removable storage media, and a pointing device 106, such as a mouse. Additional input devices may be included with personal computer 100, as will be readily apparent to those of ordinary skill in the art.

The personal computer 100 can be implemented using any suitable computer. Although the depicted representation shows a personal computer, other embodiments of the present invention may be implemented in other types of data processing systems, such as mainframes, workstations, network computers, Internet appliances, palm computers, etc.

The system unit 110 comprises memory, a central processing unit, one or more I/O units, and the like. However, in the present invention, the system unit 110 preferably contains a speculative processor, either as the central processing unit (CPU) or as one of multiple CPUs present in the system unit.

With reference now to FIG. 2, a block diagram of a data processing system in which the present invention may be implemented is illustrated. Data processing system 250 is an example of a computer, such as, for example, personal computer 100 in FIG. 1. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 266 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2. The operating system may be a commercially available operating system such as JavaOS For Business™ or OS/2™, which are trademarks of an products available from International Business Machines Corporation of Armonk, N.Y. JavaOS is loaded from a server on a network to a network client and supports Java programs and applets. A couple of characteristics of JavaOS that are favorable for performing traces with stack unwinds, as described below, are that JavaOS does not support paging or virtual memory. An object-oriented programming system, such as Java, may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2 may vary depending on the implementation. For example, other peripheral devices, such as optical disk drives and the like may be used in addition to or in place of the hardware depicted in FIG. 2. The depicted example is not meant to imply architectural limitations with respect to the present invention. For example, the processes of the present invention may be applied to a multiprocessor data processing system.

With reference now to FIG. 3, a block diagram of components used for updating an installation file is depicted in accordance with the present invention. Typically, when a software developer writes an application program, such as, for example, a word processor, a web browser, or a computer video game, the software developer zips or compresses the data files into a single smaller data file for delivery to a consumer. Many times the uncompressed files may not be contained on a single computer readable media, such as, for example, a floppy disk or a CD-ROM. However, the compressed file is often small enough to be contained on a single computer readable media for delivery to the consumer, thus costing both the manufacturer and the consumer less. Furthermore, if the application program is delivered to the consumer via a network such as the Internet, the smaller zipped data file takes less time to download then the uncompressed version of the application program.

For an application program to be installed correctly on a particular platform, an installation program must be included. Typically, software developers do not develop their own installer, but use a previously developed install toolkit, such as, for example, a Java install toolkit. The software developer places the files associated with the install toolkit, which may number in the hundreds, along with the files for the application program itself into one directory 302. This directory may contain a number of installation files, such as, for example, jfile.class, installer.class, uninstall.class, data.zip, and program.class, as well as application program files, such as, for example, application program file 1 and application program file 2 depicted in FIG. 3. Once the install and application files are in the directory 302, the files are zipped (step M1) i.e. compressed into a single self-extracting install file 304 often named "install.class".

When a new version of the install toolkit is made available, the update patch program 310, called "fix.class", is downloaded or otherwise loaded onto a user's computer. A patch or patch program is a temporary or quick fix program. Patches are used to update programs without replacing the entire program. Portions of machine code or object code may be replaced instead of decompiling the entire program. A patch also may replace an entire executable module or other files in an application. This new version of the install toolkit may, for example, add or improve support for a particular operating system. When the user desires to update an installer, such as install file 304, update patch program 310 may be executed as a command line utility with the following arguments:

java fix [install.class]-norun

Executing the patch program extracts (step M2) the files from install file 304 into directory 302. The patch program then compares (step M3) the sets of files in directory 302 with the version of update patch program 310 to determine whether current install file 304 has a more recent version of the installation toolkit or whether update patch program 310 contains the more recent version of the install toolkit. In one embodiment, the version of each installer toolkit may be obtained from the file program.class. In such embodiment, the file program.class contains information that indicates the version number of all files of the installation toolkit within for install file 304. For example, in Java code, one line of the code in the file program.class may contain the following string:

String version="x"

In this string, "version" is a variable name that indicates that the version of the files contained within install file 304 are version "x", where "x" could be any string of characters. Thus, in the example depicted in FIG. 3, the string within program.class for install file 304 appears as follows:

String version="V1.4"

The placement of this string line within the file program. class is not important.

Of course, the file containing the version number of the install toolkit utilized by install file 304 may be given any name desired by the installation toolkit developer. An alternative method of comparing the versions of the two installation toolkits may allow for the version of each file to be obtained and compared with the version of the fix file within fix.class 310 and each file updated independently of the other files.

If install file 304 contains the more recent version, the files are deleted from directory 302 and no further action is be taken. If, instead, install file 304 does not contain the more recent version of the install toolkit files, as illustrated in FIG. 3 where the install file 304 is version V1.4 and the patch file contains install toolkit version V1.5, then the patch file extracts (step M4) the install toolkit files from fix.class into directory 302 overwriting the install toolkit files within directory 302 with the new versions of the files to update (step M5) the install file 304. The updated files within directory 302 are then combined or compressed 330 up into a new install file 308 overwriting the previous install file 304. The files within directory 302 are then deleted to clean up the directory structure of the computer, freeing up disk space and returning the computer to its original condition except for having an updated installer.class 308.

In a preferred embodiment, update patch program 310 may update any number of versions of install files 304 regardless of the version number of the installer or which platform install file 304 is intended. The same fix.class 310 may update two different installers without the use of an intermediary patch. Thus, the same update patch program 310 may update version V1.1 to version V1.5, as well as update installer version V1.3 to V1.5. Furthermore, there is no requirement that one fix.class file be used to update the installer to an intermediate version, such as, for example, from V1.1 to V1.4, and then a second fix.class file be used to update the intermediate version of the installer to the final version, such as, for example, from V1.4 to V1.5.

The "-norun" flag of the command line argument discussed above disables running the install file 308 after the update has been completed. Alternatively, the "-norun" flag may be replaced by a "-run" flag to enable running the install file 308 after the update has been completed.

The [install.class . . . ] flag of the command line argument discussed above may include the directory file path and name of multiple installer files. Thus, the patch file 310 may update many different installation files within the computer.

Other methods of executing the patch file 310, other than utilizing the above-given example of a command line, may be utilized as well.

Although described primarily with reference to a java installation toolkit, the present invention is applicable to other programming languages as well, such as, for example, C and C++. Furthermore, although described primarily with reference to updating the installation toolkit portion of an installer, the present invention may also be implemented to update the application program files, as well as the installation files within the installer. In such case, the update program would contain not only the updated installation toolkit files, but also the updated application program code and data files as well. The present invention also may be used to update any collection of files to reflect an updated version.

It should also be noted that although described primarily with reference to updating an installer to a newer version of the installer, the present invention may also be applied to update an installer or other collection of files to a correct version, rather than a more recent or newer version. The correct version may be an older version of the installer files than the version of the installer to be updated. For example, an installer may contain a newer version of the installer files than the update patch, but nevertheless fail to perform correctly. Thus, the update patch, in such example, overwrites its older, but correct files, into the installer, such that the installer has a correct set of installer files.

Figure 4:
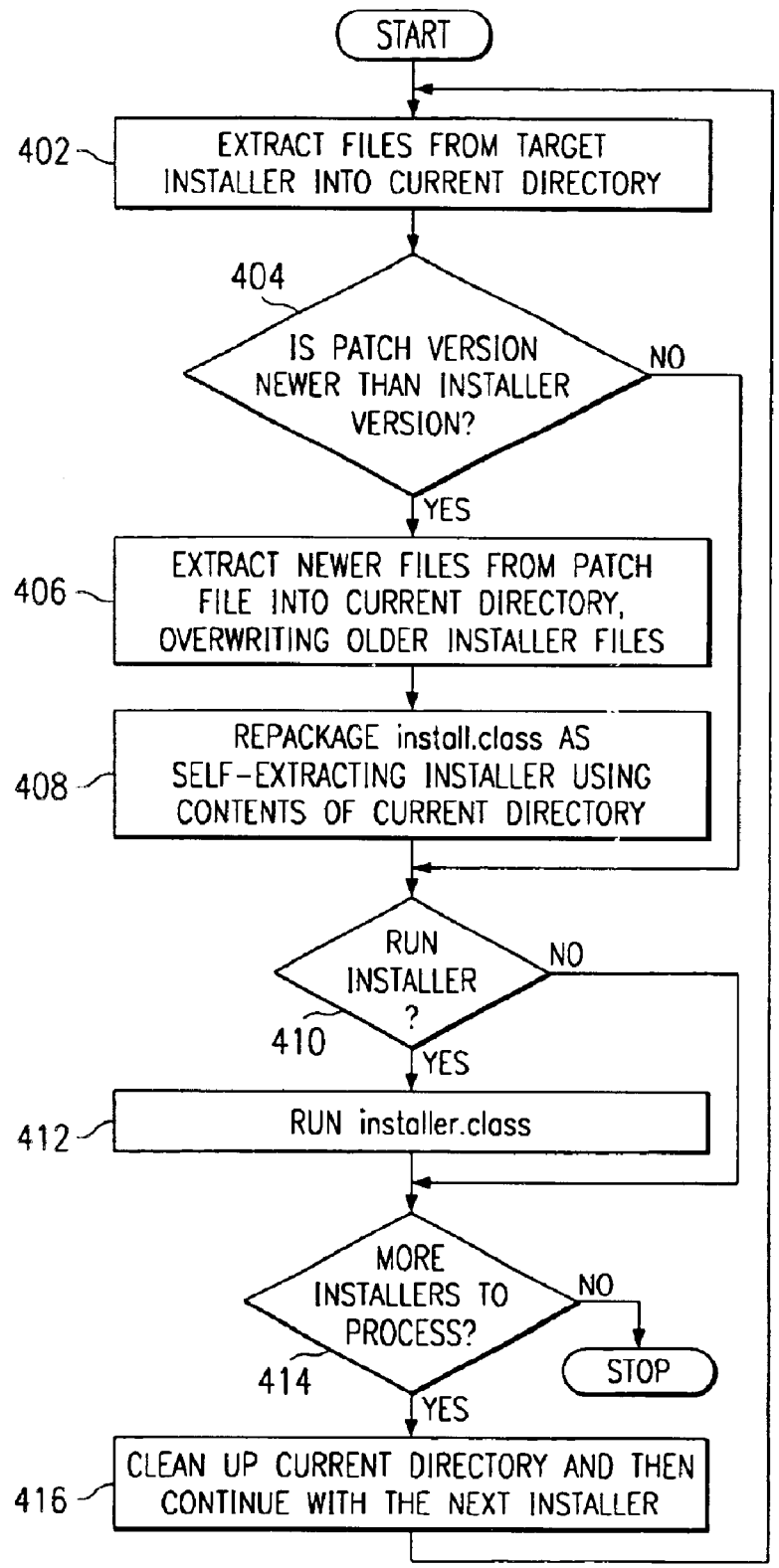
FIG. 4 depicts a flowchart illustrating a method of updating installation files or programs with an updated version of the install toolkit files in accordance with the present invention.

With reference now to FIG. 4, a flowchart illustrating an exemplary method of updating installation files with an updated version of the install toolkit files is depicted in accordance with the present invention. Once the patch file, such as, for example, update patch program 310 in FIG. 3, containing the updated files is received by the user, the user executes the patch file. To begin, the target installer, such as, for example, install file 304 in FIG. 3, that needs to be updated is de-compressed to extract the installation files and these files are placed into an empty directory (step 402). The patch file then determines whether the patch version of the target installer version contains the more recent version of the installer toolkit (step 404). The patch file may perform this comparison by looking at a single file, such as, for example, program.class, as discussed above.

If the target installer contains the same or more recent version, then the patch file leaves the extracted files unmodified and determines whether a user has requested to run the installer (step 410). On the other hand, if the patch version contains the more recent version of the installation toolkit, then the newer files are extracted from the patch file and placed into the directory containing the old installer files overwriting the older installer files (step 406). The updated collection of installer files, including application program files, are then repackaged as a self-extracting installer (step 408).

Next, the patch program determines whether the user has requested to run the target installer (step 410). If yes, then the self-extracting installer is run. The self-extracting installer specifies where files for the application program are to be placed and what parameters are to be called.

After running the self-extracting installer, or if the user has not requested to run the self-extracting installer, the patch program determines whether there are more installers to update (step 414). If there are not more installers to update, then the installer files are deleted out of the directory into which they had been extracted and the process stops. If there are more installers to update, the directory is still cleaned up by deleting all the installer files (step 416) and the process begins with the new installer at step 402.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal-bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for updating code, the method comprising:
   providing an update to a plurality of versions of a program, wherein the program is updated by an installer program and a plurality of versions of the installer program exist;
   determining whether a version of the installer program is incorrect with respect to the update;
   responsive to the version of the installer program being incorrect, updating the installer program from files in the update; and
   installing the update in the program with the updated installer program.

2. The method as recited in claim 1, wherein a determination that the version of the installer is older than the update indicates that the version of the installer program is incorrect.

3. The method as recited in claim 1, wherein a determination that the version of the installer is more recent than the update indicates that the version of the installer program is incorrect.

4. The method as recited in claim 1, wherein the version of the installer program is determined from a single one of a plurality of files contained within the installer program.

5. The method as recited in claim 1, wherein the updating step comprises:
   extracting installer files from the installer program into a directory;
   overwriting selected files from the installer program with a corresponding updated file extracted from the update; and
   packaging the updated files and remaining installer files into an updated installer program.

6. The method as recited in claim 5, wherein the packaging step comprises compressing the updated files and remaining installer files to produce an updated installer program.

7. The method as recited in claim 1, wherein the installer program comprises an install toolkit and the update comprises an update to the install toolkit.

8. The method as recited in claim 1, wherein the installer program and the update are written in an object-oriented programming language.

9. The method as recited in claim 1, wherein the installer program comprises a java install toolkit and the update comprises an update to the java install toolkit.

10. A computer program product in a computer readable media for use in a data processing system for updating code, the computer program product comprising:
    first instructions for providing an update to a plurality of versions of a program, wherein the program is updated by an installer program and a plurality of versions of the installer program exist;
    second instructions for determining whether a version of the installer program is incorrect with respect to the update;
    third instructions, responsive to the version of the installer program being incorrect, for updating the installer program from files in the update; and
    fourth instructions for installing the update in the program with the updated installer program.

11. The computer program product as recited in claim 10, wherein a determination that the version of the installer is older than the update indicates that the version of the installer program is incorrect.

12. The computer program product as recited in claim 10, wherein a determination that the version of the installer is more recent than the update indicates that the version of the installer program is incorrect.

13. The computer program product as recited in claim 10, wherein the version of the installer program is determined from a single one of a plurality of files contained within the installer program.

14. The computer program product as recited in claim 10, wherein the third instructions comprise:
    fifth instructions for extracting installer files from the installer program into a directory;
    sixth instructions for overwriting selected files from the installer program with a corresponding updated file extracted from the update; and
    seventh instructions for packaging the updated files and remaining installer files into an updated installer program.

15. The computer program product as recited in claim 14, wherein the seventh instructions comprise compressing the updated files and remaining installer files to produce an updated installer program.

16. The computer program product as recited in claim 10, wherein the installer program comprises an install toolkit and the update comprises an update to the install toolkit.

17. The computer program product as recited in claim 10, wherein the installer program and the update are written in an object-oriented programming language.

18. The computer program product as recited in claim 10, wherein the installer program comprises a java install toolkit and the update comprises an update to the java install toolkit.

19. A system for updating code, the system comprising:
    first means for providing an update to a plurality of versions of a program, wherein the program is updated by an installer program and a plurality of versions of the installer program exist;
    second means for determining whether a version of the installer program is incorrect with respect to the update;
    third means, responsive to the version of the installer program being incorrect, for updating the installer program from files in the update; and
    fourth means for installing the update in the program with the updated installer program.

20. The system as recited in claim 19, wherein a determination that the version of the installer is older than the update indicates that the version of the installer program is incorrect.

21. The system as recited in claim 19, wherein a determination that the version of the installer is more recent than the update indicates that the version of the installer program is incorrect.

22. The system as recited in claim 19, wherein the version of the installer program is determined from a single one of a plurality of files contained within the installer program.

23. The system as recited in claim 19, wherein the third means comprise:
    fifth means for extracting installer files from the installer program into a directory;

sixth means for overwriting selected files from the installer program with a corresponding updated file extracted from the update; and seventh means for packaging the updated files and remaining installer files into an updated installer program.

24. The system as recited in claim 23, wherein the seventh means comprise compressing the updated files and remaining installer files to produce an updated installer program.

25. The system as recited in claim 19, wherein the installer program comprises an install toolkit and the update comprises an update to the install toolkit.

26. The system as recited in claim 19, wherein the installer program and the update are written in an object-oriented programming language.

27. The system as recited in claim 19, wherein the installer program comprises a java install toolkit and the update comprises an update to the java install toolkit.

28. A method in a data processing system for updating code, the method comprising:

receiving an update file for a program, wherein the update file includes an installer to update the program in which a plurality of versions of the installer exist;

determining whether the installer is a newer version of an existing installer for the program;

responsive to the installer being a new version of the existing installer, updating the existing installer to form an updated installer; and installing code in the update file in the program using the updated installer.

29. The method as recited in claim 28, wherein the updating step comprises extracting files from the update installer, overwriting corresponding older files extracted from the existing installer to form updated files, and repackaging the updated files to form the updated installer.

30. The method as recited in claim 28, wherein the update file, the program, the installer, the existing installer, and the update installer comprise object-oriented code.

31. The method as recited in claim 30, wherein the object-oriented code is java.

32. A computer program product in a computer readable media for use in a data processing system for updating code, the computer program product comprising:

first instructions for receiving an update file for a program, wherein the update file includes an installer to update the program in which a plurality of versions of the installer exist;

second instructions for determining whether the installer is a newer version of an existing installer for the program;

third instructions, responsive to the installer being a new version of the existing installer, for updating the existing installer to form an updated installer; and fourth instructions for installing code in the update file in the program using the updated installer.

33. The computer program product as recited in claim 32, wherein the third instructions comprise extracting files from the updated installer, overwriting corresponding older files extracted from the existing installer to form updated files, and repacking the updated files to form the updated installer.

34. The computer program product as recited in claim 32, wherein the update file, the program, the installer, the existing installer, and the update installer comprise object-oriented code.

35. The computer program product as recited in claim 34, wherein the object-oriented code is java.

36. A system for updating code, the system comprising:

first means for receiving an update file for a program, wherein the update file includes an installer to update the program in which a plurality of versions of the installer exist;

second means for determining whether the installer is a newer version of an existing installer for the program;

third means, responsive to the installer being a new version of the existing installer, for updating the existing installer to form an updated installer; and fourth means for installing code in the update file in the program using the updated installer.

37. The system as recited in claim 36, wherein the third means comprise extracting files from the updated installer, overwriting corresponding older files extracted from the existing installer to form updated files, and repackaging the updated files to form the updated installer.

38. The system as recited in claim 36, wherein the update file, the program, the installer, the existing installer, and the update installer comprise object-oriented code.

39. The system as recited in claim 38, wherein the object-oriented code is java.

* * * * *

UNITED STATES PATENT AND TRADEMARK OFFICE
CERTIFICATE OF CORRECTION

| | |
|---|---|
| PATENT NO. | : 6,912,711 B1 |
| APPLICATION NO. | : 09/578750 |
| DATED | : June 28, 2005 |
| INVENTOR(S) | : Curtis et al. |

It is certified that error appears in the above-identified patent and that said Letters Patent is hereby corrected as shown below:

Col. 9, line 32: after "the" delete "update" and insert --updated--.

Col. 9, line 41: after "in" delete "a".

Signed and Sealed this

Fifth Day of December, 2006

JON W. DUDAS
*Director of the United States Patent and Trademark Office*